US009209630B2

(12) United States Patent
Naghshtabrizi et al.

(10) Patent No.: US 9,209,630 B2
(45) Date of Patent: Dec. 8, 2015

(54) ACTIVE BATTERY CELL BALANCING METHODS WITH VARIABLE DURATION DISCHARGE

(75) Inventors: Payam Naghshtabrizi, Farmington Hills, MI (US); Siamak Hashemi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1237 days.

(21) Appl. No.: 13/112,554

(22) Filed: May 20, 2011

(65) Prior Publication Data

US 2012/0293129 A1 Nov. 22, 2012

(51) Int. Cl.
*H02J 7/00* (2006.01)

(52) U.S. Cl.
CPC .............. *H02J 7/0016* (2013.01); *H02J 7/0021* (2013.01); *Y02T 10/7055* (2013.01)

(58) Field of Classification Search
CPC ...................................................... H02J 7/0016
See application file for complete search history.

(56) References Cited

U.S. PATENT DOCUMENTS

| 5,594,320 | A  | * | 1/1997  | Pacholok  | H02J 7/0018 320/103 |
| 6,388,424 | B1 | * | 5/2002  | Hidaka    | H02J 7/0016 320/122 |
| 7,400,114 | B2 | * | 7/2008  | Anzawa    | B60L 11/18 320/118 |
| 7,804,276 | B2 |   | 9/2010  | Roessler  |                    |
| 7,880,433 | B2 | * | 2/2011  | Oh        | H02J 7/0016 320/118 |
| 7,939,965 | B2 | * | 5/2011  | Oh        | H02J 7/0016 307/43 |
| 7,982,429 | B1 | * | 7/2011  | Oh        | H02J 7/0016 320/118 |
| 8,508,191 | B2 | * | 8/2013  | Kim       | H02J 7/0013 320/121 |
| 2005/0017682 | A1 | * | 1/2005  | Canter    | H02J 7/0021 320/118 |
| 2009/0278489 | A1 | * | 11/2009 | St-Jacques | H02J 7/0016 320/103 |
| 2010/0090649 | A1 |   | 4/2010  | Sardat et al. |              |
| 2011/0187327 | A1 | * | 8/2011  | Oh        | H02J 7/0016 320/118 |

OTHER PUBLICATIONS

Xuezhe, Wei, Xiaopeng, Zhao, Dai Haifeng, College of Automotive Engineering, Tongji University, Shanghai, China, The Application of flyback DC/DC Converter in Li-ion batteries active balancing, Aug. 3, 2010.
Stephen W. Moore and Peter J. Schneider, SAE International, SAE Technical Paper Series, 2001-01-0959, A Review of Cell Equalization Methods for Lithium Ion and Lithium Polymer Battery Systems, SAE 2001 World Congress, Detroit, Michigan Mar. 5-8, 2001.
Werner Roessler, SAE International, SAE Technical Paper Series, 2008-01-1335, Lithium-ion Battery Management Integrating Active Load Balancing, 2008 World Congress, Detroit, Michigan Apr. 14-17, 2008.

* cited by examiner

*Primary Examiner* — Drew A Dunn
*Assistant Examiner* — Steve T Chung
(74) *Attorney, Agent, or Firm* — David B. Kelley; Brooks Kushman P.C.

(57) ABSTRACT

A method and a system for balancing cells of a vehicle battery includes discharging charge from a highest charged cell for a discharge time period dependent on a charge difference between the highest charged cell and a lowest charged cell at a given time. The cells may be charged with the discharge charge during a charge time period.

16 Claims, 4 Drawing Sheets

ACTIVE BATTERY CELL BALANCING METHODS WITH VARIABLE DURATION DISCHARGE

TECHNICAL FIELD

The present invention relates to active battery cell balancing methods.

BACKGROUND

A battery such as a Lithium-Ion (Li-Ion) battery is formed by rechargeable battery cells. To increase the voltage capability, the cells are connected in series thereby forming a pack with each unit of the pack consisting of a cell. To increase the current capability, the cells are connected in parallel such that each unit of the pack consists of two or more cells connected in parallel.

As the battery pack is charged and discharged as a single unit, differences in the cells in capacities, temperatures, internal chemical characteristics, internal resistance, degradation, and the like can cause cell imbalances in the form of charge variations. Imbalanced cells can cause over-charging and over-discharging damage and thereby decrease the storage capacity and lifetime of the battery pack. In particular, a cell which experiences deviant behavior is a candidate to over-voltage during charging events. Thus, cell balancing is necessary.

Two groups of cell balancing methods include passive balancing and active balancing. In passive balancing, extra charge of the high charged cells (e.g., the cells having a charge greater than the average charge of all of the cells) is dissipated into a shunt resistor. This leads to energy inefficiency especially for applications requiring relatively high electric energy. In active balancing, extra charge of the high charged cells is removed and then transferred to the low charged cells (e.g., the cells having a charge lower than the average charge of all of the cells).

Active cell balancing methods can be grouped into two types: charge shuttling and energy converting. An example of a charge shuttling active balancing method is the charge shuttle (flying capacitor) charge distribution method. In this method, a capacitor is switched sequentially across each cell in the series chain. The capacitor averages the charge level on the cells by picking up extra charge from the high charged cells and then dumping the extra charge into the low charged cells. This process can be speeded up by programming the capacitor to repeatedly transfer extra charge from the highest charged cell (e.g., the cell having the highest charge) to the lowest charged cell (e.g., the cell having the lowest charge). Efficiency is reduced as the cell voltage differences are reduced. This method is also fairly complex and requires relatively expensive electronics.

An example of an energy converting active balancing method is the flyback transformer charge distribution method. In this method, the primary winding of a transformer is connected across the battery pack (i.e., the primary winding is connected to both ends of the battery pack). Pursuant to a "switched transformer" arrangement, a secondary winding of the transformer is configured to be switched across the individual cells. Alternatively, pursuant to a "shared transformed" arrangement, each cell has its own secondary winding which can be switched into the primary winding. In either arrangement, current is taken from the entire pack and is switched into the transformer. In turn, the transformer output is delivered to the low charged cells. As such, this method is used to take pulses of energy as required from the full battery pack, rather than small charge differences from a single cell, to top up the remaining cells. This method averages the charge level as with the charge shuttle flying capacitor charge distribution method, but avoids the problem of small voltage differences in the cells and is consequently much faster. Each secondary winding has to be well-balanced or else the secondary windings will contribute to the balancing problem.

Taking into account cell equalization times, it is desirable to implement methods for fast cell balancing to decrease the total charging time and increase energy efficiency. It is further desired that such methods avoid unnecessary switching during equalization as such switching can degrade efficiency of balancing, reduce switch life, and increase high-frequency noise.

SUMMARY

In an embodiment, a method for balancing cells of a vehicle battery having a highest charged cell, a lowest charged cell, and one or more intermediate charged cells is provided. The method includes discharging charge from the highest charged cell for a discharge time period dependent on a charge difference between the highest charged cell and a the lowest charged cell at a given time. The method may further include charging the cells with the discharged charge for a charge time period after the discharge time period in which the charge time period is a function of the discharge time period. The discharge time period may correspond to a time period of discharging charge from the highest charged cell until the charge of the highest charged cell is equal to the charge of the lowest charged cell whereby at least one of the intermediate charged cells becomes the highest charged cell. The discharge time period may be dependent on the charge differences between the maximum charge capability of the cells and the charge of each of the cells.

In an embodiment, a system having a transformer arrangement and a controller is provided. The transformer arrangement is configured to discharge charge from any of the cells and to charge the cells with the discharged charge. The controller is configured to control the transformer arrangement to discharge charge from the highest charged cell for a discharge time period dependent on a charge difference between the highest charged cell and the lowest charged cell at a given time. The controller may be further configured to control the transformer arrangement to charge the cells with the discharged charge for a charge time period after the discharge time period in which the charge time period may be a function of the discharge time period. The discharge time period may correspond to a time period of discharging charge from the highest charged cell until the charge of the highest charged cell is equal to the charge of the lowest charged cell whereby at least one of the intermediate charged cells becomes the highest charged cell. The discharge time period may be dependent on the charge differences between the maximum charge capability of the cells and the charge of each of the cells. The transformer arrangement may be a switched transformer arrangement or a shared transformer arrangement.

In an embodiment, another method for balancing cells of a vehicle battery such as a Lithium-Ion battery having a highest charged cell, a lowest charged cell, and one or more intermediate charged cells is provided. This method includes discharging charge from all of the cells for a discharge time period dependent on a charge difference between the highest charged cell and the lowest charged cell at a given time. This method may further include charging the lowest charged cell with the discharged charge for a charge time period after the discharge time period. The charge time period may correspond to a time period of charging the lowest charged cell with the discharged charge until the charge of the lowest charged cell is equal to the charge of the highest charged cell whereby at least one of the intermediate charged cells becomes the lowest charged cell.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
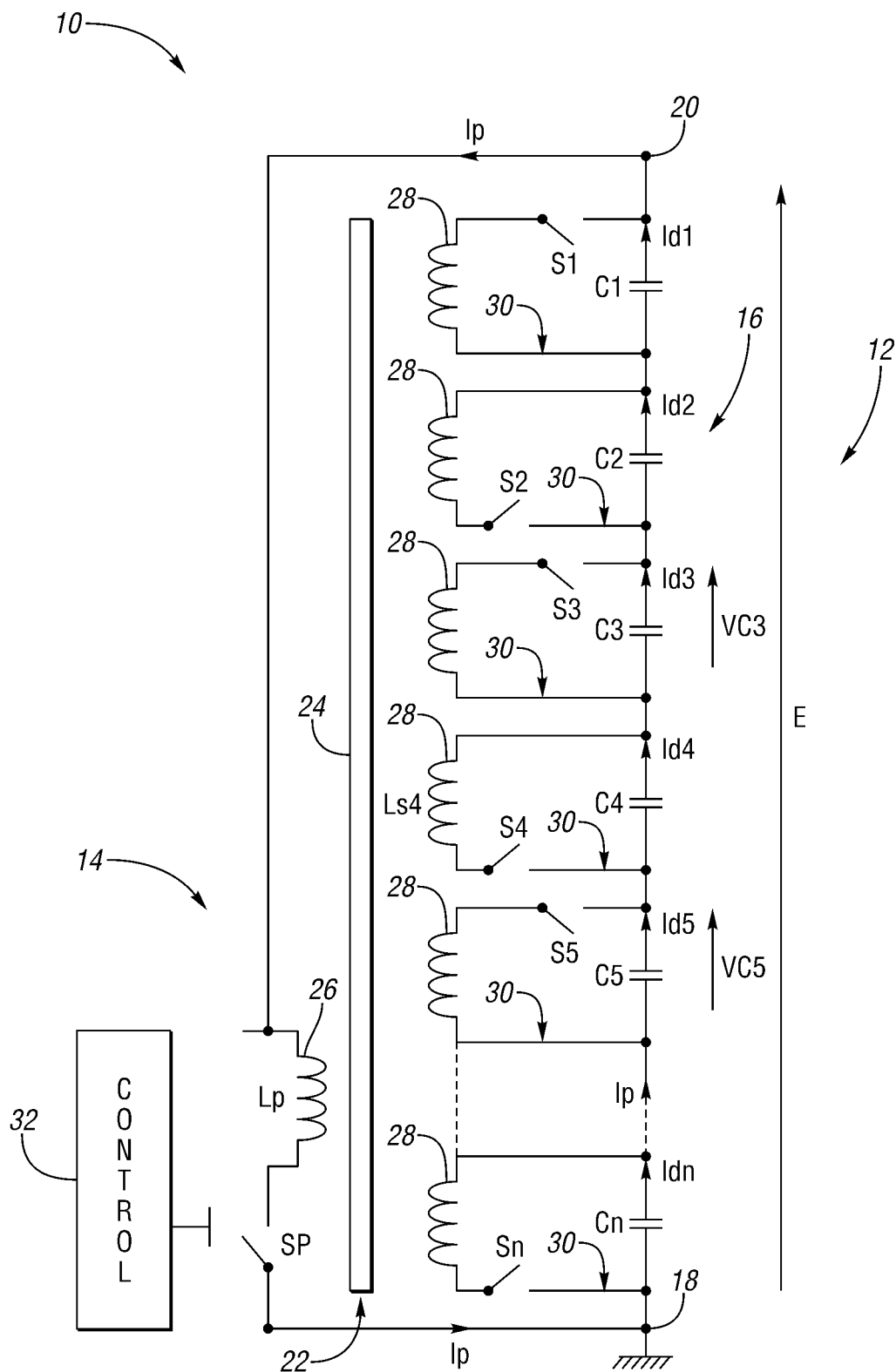
FIG. 1 illustrates a shared transformer balancing arrangement capable of carrying out methods in accordance with embodiments of the present invention.

Referring now to FIG. 1, a shared transformer balancing arrangement 10 capable of carrying out methods in accordance with embodiments of the present invention is shown. Arrangement 10 generally includes a battery 12 and a balancing circuit 14.

Battery 12 may be a Lithium-Ion (Li-Ion) battery. Battery 12 may be used in an electric vehicle for supplying electric energy. Battery 12 is configured to be charged during a recuperative braking phase and to be discharged during phases of vehicle propulsion. Battery 12 is formed by a pack 16 of rechargeable battery cells C1, C2, . . . , Cn connected in series. The number of cells is for example equal to ten (i.e., n=10). However, any number of cells may be connected in series. Further, although each unit of battery pack 16 is illustrated in FIG. 1 as only having one cell, each unit of the pack may include two or more cells connected in parallel.

Battery 12 includes two external terminals 18 and 20 at respective ends of battery pack 16 (i.e., terminals 18 and 20 are respectively at first and second opposite ends of the series circuit formed by the cells of the battery pack). In this example, terminal 20 is the positive terminal and terminal 18 is the negative or ground terminal. The voltage between terminals 18 and 20 is marked E. The voltage at the terminals of each cell Ci is marked VCi. Ip designates the current circulating between terminals 18 and 20. Idi designates the discharge current associated with each cell Ci.

The cells of battery pack 16 each serve for storing energy in the form of electric charge. For charging the cells with electric energy, a charging circuit (not shown) may be connected to terminals 18 and 20. The cells may be charged by feeding a charging current to terminal 20. Likewise, the cells may be discharged by drawing a discharging current from terminal 20.

During charging and discharging of the cells, different charge states between the cells individually may occur. In general, the voltage across a cell is dependent on the charge stored in that cell. The stored charge of a cell defines the charge state (i.e., the state of charge (SOC)) of the cell. The voltage available across the cell is approximately constant for a wide range of the SOC. For instance, for a Li-Ion cell this voltage, referred to as nominal voltage, is between 3.3 and 3.6 volts. The range of the SOC for which the voltage is approximately constant is referred to as the operating area. If the cell is charged beyond the operating area, then the voltage of the cell increases rapidly. In this instance, the maximum storage capacity of the cell is reached and the cell may not be charged further. If the cell is discharged below the operating area, then the voltage of the cell decreases rapidly.

Due to factors such as production processes and different wear during operation the cells may have different capacities. The result is that some of the cells during the charging process are completely charged earlier than the other cells. The charging process should be stopped as soon as one of the cells reaches its maximum SOC. Correspondingly, during the discharging process, some of the cells may be discharged below their operating area earlier than other cells. Likewise, the discharging process should be stopped as soon as one of the cells has been discharged below its operation area.

In order to maximize the lifetime and the useable capacity of the cells of battery pack 16, it is desired to balance the charge state of the cells. This may be done at the end of a charging process, at the end of a discharging process, or during operation of the cells (i.e., when battery pack 16 is used for providing electrical energy to a load).

In this connection, as indicated above, arrangement 10 further includes a balancing circuit 14. Balancing circuit 14 is configured to draw electric energy from at least one of the cells and transfer this energy to at least one of the other cells in order to balance the charge state of the cells. That is, balancing circuit 14 is configured to increase the charge (e.g., the SOC) of at least one of the cells (e.g., a cell having a low SOC) with energy drawn from at least one of the other cells (e.g., a cell having a high SOC).

Balancing circuit 14 generally includes a transformer 22 and a controller 32. Transformer 22 includes a core 24, a primary winding 26 having an inductance Lp, and a plurality of secondary windings 28 each having an inductance Lsi. Primary winding 26 is mounted in series with a switch SP. As an example, switch SP is a MOSFET transistor with a drain connected to primary winding 26 and a source connected to ground terminal 18. Primary winding 26 and switch SP are connected to external terminals 18 and 20 of battery pack 16. Thus, primary winding 26 and switch SP are connected in parallel to battery pack 16. The number of secondary windings 28 corresponds to the number of cells. Each secondary winding 28 forms part of a loop 30 connected to the terminals of a respective cell of battery pack 16. Each loop 30 includes a switch Si in series with secondary winding 28 of that loop. While the switch of a loop 30 is closed, secondary winding 28 of that loop is connected in parallel to the corresponding cell. Although not shown, each loop 30 may further include a diode Di in parallel with the switch of that loop. Secondary windings 28 are inductively coupled to primary winding 26 via core 24.

Controller 32 is configured to feed control signals to the switches of loops 30 to individually open and close these switches. Likewise, controller 32 is configured to feed a control signal to switch SP in order to open and close this switch.

Primary winding 26 connected in parallel to battery pack 16 and secondary windings 28 individually connected in parallel to corresponding cells of a plurality of flyback converters. The number of converters is equal to the number of secondary windings 28 which is equal to the number of cells. Each converter may be operated bi-directionally and connected between the series circuit of the cells and the individual cells. "Bi-directional operable" means that energy from any of secondary windings 28 may be transferred to primary winding 26 and that energy from primary winding 26 may be transferred to any of secondary windings 28. Through this, energy may selectively be taken from individual cells and fed back to the overall battery pack 16 or energy may be taken from the overall battery pack 16 and selectively fed back to individual cells.

Accordingly, balancing circuit 14 has two operation modes. The first operation mode, i.e., the top balancing operation mode, involves discharging charge from the entire battery pack 16 and then charging selective cells (namely, one or more low charged cells) of the battery pack. The intended result of the first operation mode is that extra charge is removed from the high charged cells and transferred to the low charged cells. The second operation mode, i.e., the bottom balancing operation mode, involves discharging charge from selective cells (namely, one or more high charged cells) of battery pack 16 and then charging the entire battery pack with the discharged charge. Again, the intended result of the second operation mode is that extra charge is removed from the high charged cells and transferred to the low charged cells.

In the first or top balancing operation mode of balancing circuit 14, switch SP is switched on (i.e., switch SP is closed) and the switches S of loops 30 are switched off (i.e., switches S are opened) for a discharging time period. Through this, energy is taken from the entire battery pack 16 and is stored in primary winding 26. The discharging time period defines the amount of energy that is taken from battery pack 16. The discharging time period ends when switch SP is switched off (i.e., switch SP is opened). Subsequently, at least one of the switches S of loops 30 is switched on for a charging time period. For example, switch S5 of loop 30 associated with cell C5 is switched on (i.e., switch S5 is closed) for the charging time period. Through this, the discharged energy that has before been stored in primary winding 26 is transferred to secondary winding 28 associated with cell C5 from where this energy flows into cell C5.

Primary winding 26 and secondary windings 28 may be realized as coils. The winding sense of these coils is selected such that energy from primary winding 26 to any of secondary windings 28 is not transferred until switch SP is opened. In the operation mode explained above, primary winding 26 acts as a primary coil of the converters formed with secondary windings 28.

As indicated above, after switch SP is opened after the discharging time period, at least one of the switches S of loops 30 should be closed in order to avoid over-voltages at the secondary windings 28. Optional rectifying elements, e.g. diodes, may be individually connected in parallel to the switches S of loops 30. These rectifying elements are connected such that they allow current to flow from secondary windings 28 to the cells connected thereto, but prevent current flow in the opposite direction to thereby prevent unintended discharge of the cells. If after switch SP is switched opened and none of the switches S of loops 30 have been switched closed, then the rectifying elements allow current to flow to the cells and thereby prevent over-voltages at secondary windings 28.

In the second or bottom balance operation mode of balancing circuit 14, the switch S of at least one loop 30 is closed and switch SP is opened for a discharge time period. For instance, switch S3 of loop 30 associated with cell C3 is closed while switch SP is opened from the discharge time period. Through this, energy is taken from cell C3 and is stored in secondary winding 28 associated with cell C3. The discharging time period defines the amount of energy that is taken from cell C3. The discharging time period ends when switch S3 is opened. Subsequently, switch SP is switched closed for a charging time period. Through this, the discharged energy that has been taken from cell C3 and stored in secondary winding 28 associated with cell C3 is transferred to primary winding 28. In turn, this energy flows from primary winding 26 into the entire battery pack 16 via terminals 18 and 20. Again, in order to avoid over-voltages across primary winding 26, a rectifying element such as a diode may be connected in parallel to switch SP. This diode is connected such that it allows no current to flow via terminals 18 and 20 when switch SP is opened.

As described, the first operation mode of balancing circuit 14 may be activated when one or more cells have been discharged to a higher degree than the other cells after a discharging process. In this case, energy is taken from the entire battery pack 16 and then selectively distributed to the cells that have been discharged more in order to balance the charge state of the cells. The second operation mode of balancing circuit 14 may be activated when one or more of cells have been charged to a higher degree than the other cells after a charging process. In this case, energy is selectively taken from the cells that have been charged more and then distributed to the entire battery pack 16.

Controller 32 is configured to select the operation mode of balancing circuit 14. Further, controller 32 is configured to select the cells to be charged and the cells to be discharged. Controller 32 selects the charging and/or discharging based on the state of charge (SOC) of the cells. To this end, controller 32 is operable to monitor the voltages VCi of the cells Ci via the use of voltage measurement signals fed to controller 32. The voltage measurement signal for a given cell is indicative of the voltage of that cell. The individual voltage measurement signals may be, for example, provided by differential amplifiers (not shown) individually connected in parallel to the cells.

As described above, the voltage across a cell can be a measure of the SOC of that cell. The voltage measurement signals provided to controller 32 therefore represent the charge state of the individual cells. Controller 32 is adapted to select the operation mode for the transfer of charge between the individual cells dependent on these voltage measurement signals.

"Balancing" herein denotes one of the processes explained above in regards to the first and second operation modes of balancing circuit 14 in which energy from the overall battery pack 16 is selectively transferred to individual cells or in which energy is selectively taken from individual cells and transferred to the overall battery pack.

The number of balancing cycles to be performed may be fixed. Further, balancing cycles may be performed until the charge states of the individual cells differ from each other less than a given amount. In this connection, balancing cycles may be repeated until a voltage difference between the cell currently having the highest charge state and the cell currently having the lowest charge state is lower than a given amount.

This strategy may be applied for balancing cycles of the first and second operation modes of balancing circuit 14. With regard to the number of balancing cycles, the operation mode of balancing circuit 14, and the selection of individual cells, which are selectively provided with energy of from which energy is taken, different strategies may be performed in accordance with embodiments of the present invention.

The first operation mode of balancing circuit 14 may be selected if the charge state of one or more cells is lower than the charge state of the majority of the remaining cells. The second operation mode of balancing circuit 14 may be selected if the charge state of one or more cells is higher than the charge state of the majority of the remaining cells. Furthermore, either operation mode may be predefined by an external signal (not shown) provided to controller 32. This signal may be generated, for example, by the charging circuit (not shown). This signal may be generated, for example, to select the first operation mode at the end of the charging process and thereby selectively take energy from individual cells or to select the second operation mode at the end of a discharging process and thereby selectively feed energy to individual cells. Such an external signal may also be generated dependent on the direction of current that has flown into or from battery pack 16. If current has flown into battery pack 16, then a charging process is assumed and the second operation mode is selected. If current has flown from battery pack 16, then a discharging process is assumed and the first operation mode is selected.

As indicated above, arrangement 10 is a shared transformer balancing arrangement. The "shared transformer" can be understood as primary winding 26 is shared by secondary windings 28. A similar balancing arrangement is a switched transformer balancing arrangement. As described with respect to FIG. 2, the "switched transformer" can be understood as primary winding 26 functions in conjunction with a single secondary winding 28 that can be individually connected in parallel to one cell at a time. The switching of the single secondary winding 28 across one cell at a time is akin to the switching of the capacitor in the charge shuttle (flying capacitor) charge distribution method described above in the Background section.

Figure 2:
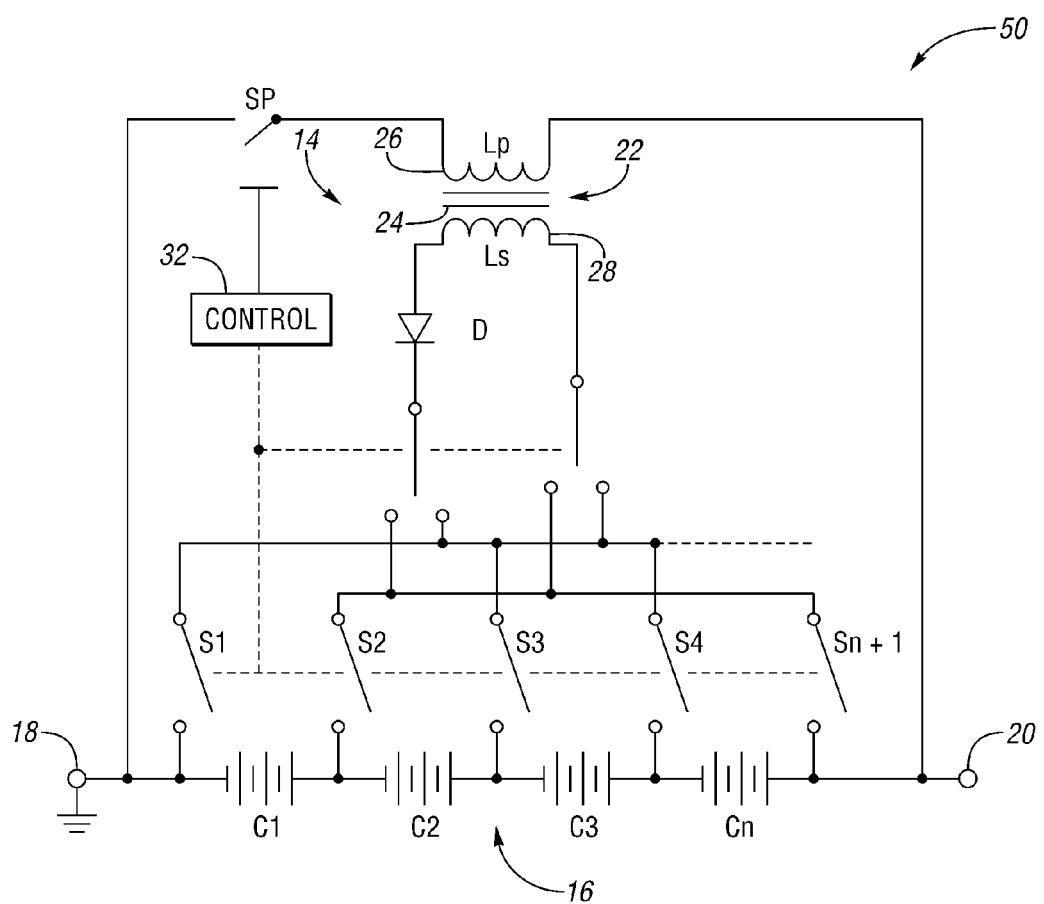
FIG. 2 illustrates a switched transformer balancing arrangement capable of carrying out methods in accordance with embodiments of the present invention.

Referring now to FIG. 2, with continual reference to FIG. 1, a switched transformer arrangement 50 capable of carrying out methods in accordance with embodiments of the present invention is shown. Like elements of shared arrangement 10 and switched arrangement 50 have the same reference numerals. Transformer 22 of switched arrangement 50 includes a single secondary winding 28 that can be individually switched in parallel with one cell of battery pack 16 at a time. In contrast, as described above, transformer 22 of shared arrangement 10 includes a plurality of secondary windings 28 which can be respectively switched in parallel with the cells. Other than this structural difference, the description regarding the general features and operation modes of shared arrangement 10 is applicable to switched arrangement 50.

Embodiments of the present invention provide energy converting fast-active battery cell balancing methods with variable duration discharge for both the first and second (i.e., the top and bottom) operation modes of balancing circuit 14.

In particular, an embodiment of the present invention provides an energy converting fast-active battery cell balancing method with variable duration discharge for the first or top balancing operation mode of balancing circuit 14. As described above, in the first operation mode, the entire battery pack 16 is discharged in order to remove extra charge from a high charged cell and then the discharged charge is transferred to a low charged cell. As such, this method is directed to charging the lowest charged cell with energy from the whole battery pack 16.

Similarly, an embodiment of the present invention provides an energy converting fast-active battery cell balancing method with variable duration discharge for the second or bottom balancing operation mode of balancing circuit 14. As described above, in the second operation mode, a high charged cell is discharged to remove extra charge therefrom and the discharged charge is then transferred to the entire battery pack 16 in order to charge a low charged cell. As such, this method is directed to charging the whole battery pack 16 with energy from a high charged cell.

A general feature of both methods is determining the discharge time period. In particular, a general feature of the first operation mode method is determining the discharge time period during which the entire battery pack 16 is discharged. The charge time period during which the low charged cell is charged with the discharged energy from battery pack 16 depends on the discharge time period during which the entire battery pack 16 is discharged.

Likewise, a general feature of the second operation mode method is determining the discharge time period during which the high charged cell is discharged. The charge time period during which the entire battery pack 16 is charged with the discharged charge from the high charged cell depends on the discharge time period during which the high charged cell is discharged.

As explained below, both discharge time periods depend on various factors which typically change from one balancing cycle to the next balancing cycle. Accordingly, each method is characterized as having a "variable duration discharge" feature as the discharge time period changes from one balancing cycle to the next balancing cycle in correspondence to the changed factors between the balancing cycles. For example, in the first operation mode method, the discharge time period during which the entire battery pack 16 is discharged during one balancing cycle will be different than the discharge time period during which the entire battery pack 16 is discharged during another balancing cycle as the discharge time period factors will change between these two different balancing cycles. Likewise, in the second operation mode method, the discharge time period during which the high charged cell is discharged during one balancing cycle will be different than the discharge time period during which the high charged cell (which may now be a different cell) is discharged during another balancing cycle as the discharge time period factors will change between these two different balancing cycles.

Figure 3:
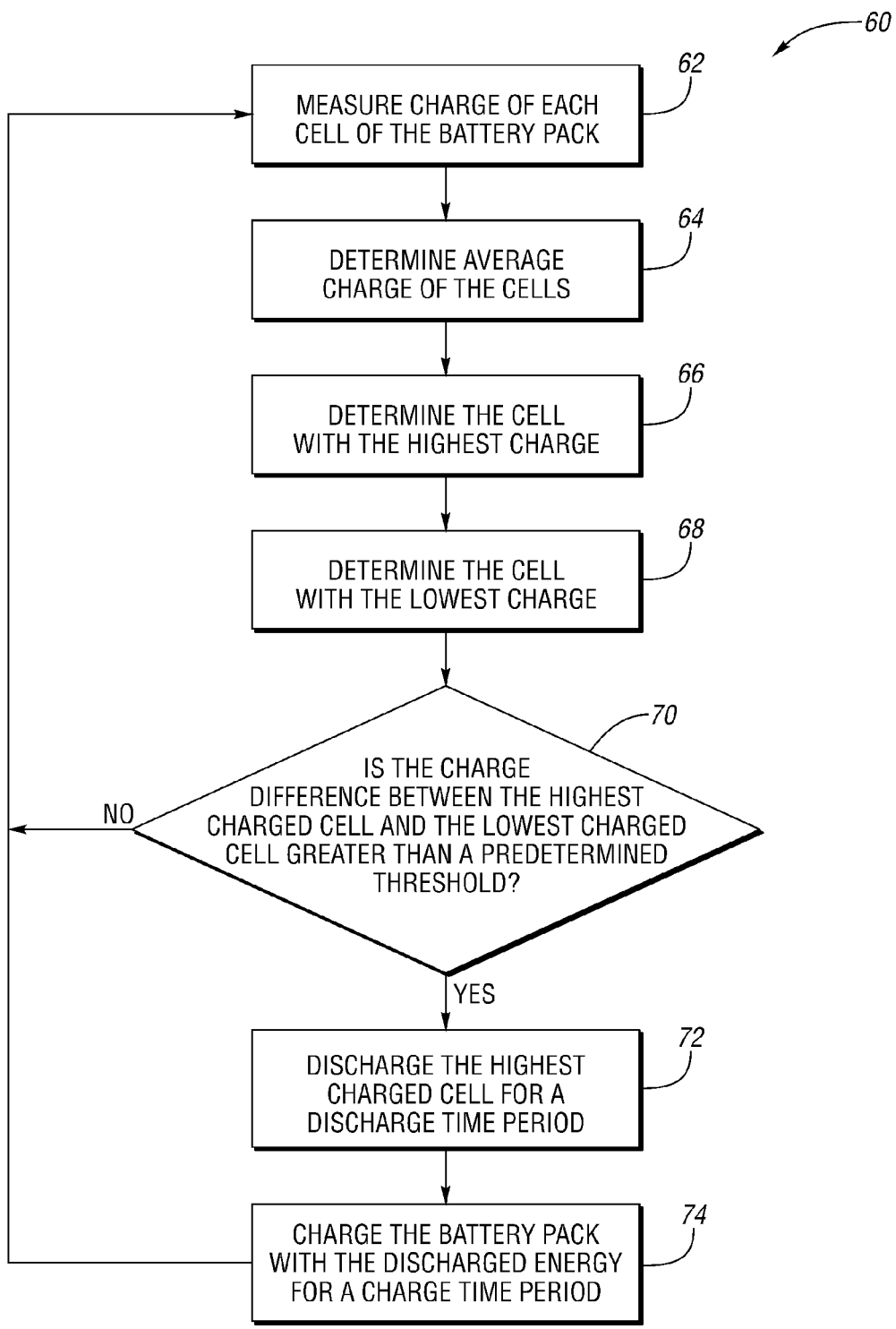
FIG. 3 illustrates a flow chart describing operation of an energy converting fast-active cell balancing method with variable duration discharge for a bottom balancing operation mode in accordance with an embodiment of the present invention.

Referring now to FIG. 3, a flowchart 60 describing operation of the energy converting fast-active battery cell balancing method with variable duration discharge for the second or bottom balancing operation mode is shown. The operation of this method will be explained with reference to switched transformer balancing arrangement 50 shown in FIG. 2. As shown in FIG. 2, battery pack 16 includes a plurality of cells C1, C2, Cn in series. That is, battery pack 16 includes i=1, 2, . . . , n cells. As is typically the case at an arbitrary time, assume that each cell has a different charge (i.e., a different SOC) denoted by z. For instance, cell C1 has a charge $z_1$ or $SOC_1$, cell C2 has a charge $z_2$ or $SOC_2$, etc., such that the i-th cell has a charge $z_i$ or $SOC_i$.

The operation of this method begins with controller 32 measuring the charge of each cell in battery pack 16 as indicated at block 62. Controller 32 then determines the average charge of all of the cells of battery pack 16 as indicated at block 64. Based on the charge of each cell and the average charge of the cells, controller 32 further determines for each cell the difference between the charge of the cell and the average charge. Controller 32 then identifies the cell having the highest charge (i.e., the cell in which the difference between the charge of the cell and the average charge is the largest positive value amongst all of the cells) as indicated in block 66. Likewise, controller 32 then identifies the cell having the lowest charge (i.e., the cell in which the difference between the charge of the cell and the average charge is the largest negative value amongst all of the cells) as indicated in block 68.

Pursuant to blocks 64, 66, and 68, the following equations are denoted:

$$\bar{z} := \frac{z_1 + \ldots + z_n}{n}; e_i = z_i - \bar{z}; e_{max} := \max_i e_i; e_{min} := \min_i e_i \quad (1)$$

In equations (1): $\bar{z}$ is the average charge of the cells; $e_i$ is the difference between the charge of the ith cell and the average charge; $e_{max}$ is the difference between the charge of the highest charged cell and the average charge; and $e_{min}$ is the difference between the charge of the lowest charged cell and the average charge. Based on the above definitions, $e_{max} \geq 0$ and $e_{min} \leq 0$.

Without loss of generality, assume that cell $C_i$ has the ith highest SOC. Accordingly, $z_1(0) = \bar{z} + e_{max}$ and $z_n(0) = \bar{z} + e_{min}$, at time t=0.

Controller 32 then determines if the charge difference between highest charged cell and the lowest charged cell is greater than a predetermined threshold as indicated in block 70. If so, then a balancing cycle starts. That is, if $\|e_{max} - e_{min}\| \geq \delta$, where $\delta$ is the predetermined threshold, then a balancing cycle starts. If not, then this iteration through the method is terminated and a new iteration starting at block 62 commences when the method is repeated. The predetermined threshold or calibrating parameter $\delta$ determines the maximum allowable charge or SOC mismatch of the cells (for example, $\delta = 0.03$ allows 3% SOC mismatch between the cells).

The balancing cycle begins with discharging the cell having the highest charge (in this case, the first cell C1 is discharged pursuant to the above-noted assumption that cell $C_i$ has the ith highest SOC) for a discharge time period as indicated at block 72. As described, secondary winding 28 is connected in parallel to cell C1 and primary winding 26 is disconnected from battery pack 16 in order for cell C1 to be discharged in secondary winding 28 during the discharge time period. Through this, charge is taken from cell C1 and is stored in secondary winding 28. This phase of the balancing cycle is the discharge phase.

The balancing cycle continues after the discharge phase with charging the entire battery pack 16 with the charge taken from cell C1 as indicated at block 74. As noted above, secondary winding 28 is disconnected from cell C1 and primary winding 26 is connected to battery pack 16. Through this, the charge that has been taken from cell C1 and stored in secondary winding 28 is transferred to primary winding 28. In turn, this charge flows from primary winding 26 into the entire battery pack 16. This phase of the balancing cycle is the charge phase.

As indicated above, the time period that cell C1 is discharged is the discharge time period ($T_d$). The time period that the entire battery pack 16 is charged is the charge time period ($T_c$).

The discharge time period ($T_d$) is determined for a given balancing cycle as a function of factors pertaining to that balancing cycle. Such factors will likely (and are presumed to) change from one balancing cycle to the next balancing cycle. Hence, the discharge time period ($T_d$) for one balancing cycle will be different than the discharge time period ($T_d$) for another balancing cycle. This operation of determining discharge time periods for different balancing cycles in which the discharge time periods are different from one another (as the factors of the different balancing cycles are different) gives rise to the "variable duration discharge" feature of this method. This can be understood as the discharge time periods change from one balancing cycle to the next balancing cycle in correspondence to the changed factors between the balancing cycles.

In particular, in this method, the discharge time period ($T_d$) for a given balancing cycle is determined as a function of the charge difference between the highest charged cell and the lowest charged cell at the beginning of the balancing cycle, i.e., the discharge time period ($T_d$) is a function of $z_1(0) - z_n(0)$, where the beginning of the balancing cycle is at time t=0, $z_1(0)$ is the charge of the highest charged cell at the beginning of the balancing cycle, and $z_n(0)$ is the charge of the lowest charged cell at the beginning of the balancing cycle. For instance, the discharge time period ($T_d$) is determined as a function of the time that it takes to discharge the highest charged cell to reach the charge of the lowest charged cell. Thus, the discharge time period ($T_d$) for one balancing cycle is different than the discharge time period ($T_d$) for another balancing cycle as the pairing of the highest and lowest charged cells and the charges carried by these cells will likely change from one balancing cycle to the next balancing cycle.

As explained below, the charge time period ($T_c$) in which battery pack 16 is charged during a given balancing cycle with the extra charge removed from the high charged cell is a function of the discharge time period ($T_d$) of that balancing cycle.

The operation of this method for determining a discharge time period ($T_d$) for a given balancing cycle will now be explained in greater detail. Assume that the discharge phase starts at time $t_0$ such that switches S1, S2 shown in FIG. 2 are closed at time $t_0$ while the other switches S are opened. The discharge current is:

$$\frac{dI_d}{dt} = \frac{V_1}{L_s}, I_d(t) = -\frac{V_1}{L_s}t,$$

where $L_s$ is the inductance of secondary winding 28 and $V_1$ is the voltage of cell C1.

Assume that the voltage change during discharge is negligible. The charge or SOC of cell C1 at the end of the discharge time period ($T_d$) can be calculated as follows:

$$z_1(T_d) = z_1(0) - \frac{1}{C_1}\int_0^{T_d} \frac{V_1}{L_s}t\,dt = z_1(0) - \frac{V_1 T_d^2}{2C_1 L_s} \quad (2)$$

where $C_1$ is the capacity of cell C1.

The stored energy ($W(T_d)$) in secondary winding 28 at the end of the discharge time period ($T_d$) is equal to:

$$W(T_d) = -\int_0^{T_d} \frac{V_1^2}{L_s} t\, dt = -\frac{V_1^2 T_d^2}{2L_s}. \tag{3}$$

At the end of the discharge time period ($T_d$), switches S1, S2 are opened and switch SP is closed. The energy charged into battery pack 16 through primary winding 26 by producing the charge current is:

$$\frac{dI_c}{dt} = \frac{V_p}{L_p}, \quad I_c(t) = \frac{V_p}{L_p} t,$$

where $L_p$ is the inductance of primary winding 26 and $V_p$ is the voltage of battery pack 16.

The total charge energy ($W(T_c)$) at the end of the charge time period (Tc) is:

$$W(T_c) = \int_0^{T_c} \frac{V_p^2}{L_p} t\, dt = \frac{V_p^2 T_c^2}{2L_p}. \tag{4}$$

Since the charge and the discharge energy from equations (3) and (4) are equal ($W(T_d) = -W(T_c)$):

$$T_c = T_d \frac{V_1}{V_p} \sqrt{\frac{L_p}{L_s}}. \tag{5}$$

The charge or SOC of cell C1 at the end of equalization (i.e., at the end of the balancing cycle) is:

$$z_1(T_c + T_d) = \bar{z} + e_{min} + \frac{V_p T_c^2}{2C_1 L_p},$$

which is the same as the lowest cell SOC since $z_n(0) = \bar{z} + e_{min}$.

The charge or SOC of the rest of the cells at the end of the equalization is:

$$z_i(T_c + T_d) = \bar{z} + e_i + \frac{V_p T_d^2}{2C_i L_p}, \quad \forall i = 2, \ldots, n,$$

As indicated above, cell C1 (i.e., the highest charged cell) is discharged until its charge reaches the charge of the lowest charged cell of battery pack 16 (in this example, the lowest charged cell is cell Cn) whereby at least one of the intermediate charged cells becomes the highest charged cell. The reason that the highest charged cell is discharged to have a charge reaching the charge of the lowest charged cell of pack 16, instead of, for example, the average charge, is that otherwise the lowest charged cell will remain the weakest.

However, it needs to be assured that after the charging phase none of the cells have a SOC greater than the maximum allowable SOC, denoted by $SOC_{max}$. If none of the other cells have a SOC reaching $SOC_{max}$ after the balancing is finished, then $z_1(T_d) = z_n(0) = \bar{z} + e_{min}$.

In this event, from equation (2), the discharge time period ($T_d$) is:

$$T_d = \sqrt{\frac{2(z_1(0) - z_n(0))C_1 L_s}{V_1}}, \tag{6}$$

The charge time period ($T_c$) is calculated from equation (5).

However, as indicated above, none of the other cells are to have a SOC reaching $SOC_{max}$ during the charging phase. So the following condition must hold:

$$z_i(T_c + T_d) = z_i + \frac{V_p T_c^2}{2C_i L_p} \leq SOC_{max} \forall i = 2, \ldots, n,$$

Consequently:

$$T_d = \begin{cases} \sqrt{\frac{2(z_1(0) - z_n(0))C_1 L_s}{V_1}} & \text{if } \frac{2(z_1(0) - z_n(0))C_1 L_s}{V_1} \leq b, \\ T_d = \sqrt{2b} & \text{otherwise,} \end{cases} \tag{7}$$

where $$b := \min_{i=2, \ldots, n} \frac{(SOC_{max} - z_i(0))C_i L_s V_p}{V_1^2}.$$

The charge time period ($T_c$) can be found from equation (5).

This concludes the description regarding the operation of the energy converting fast-active battery cell balancing method with variable duration discharge for the second or bottom balancing operation mode which is the subject of FIG. 3. As generally described, energy from the highest charged cell is removed and that energy is used to charge the whole battery pack 16.

Figure 4:
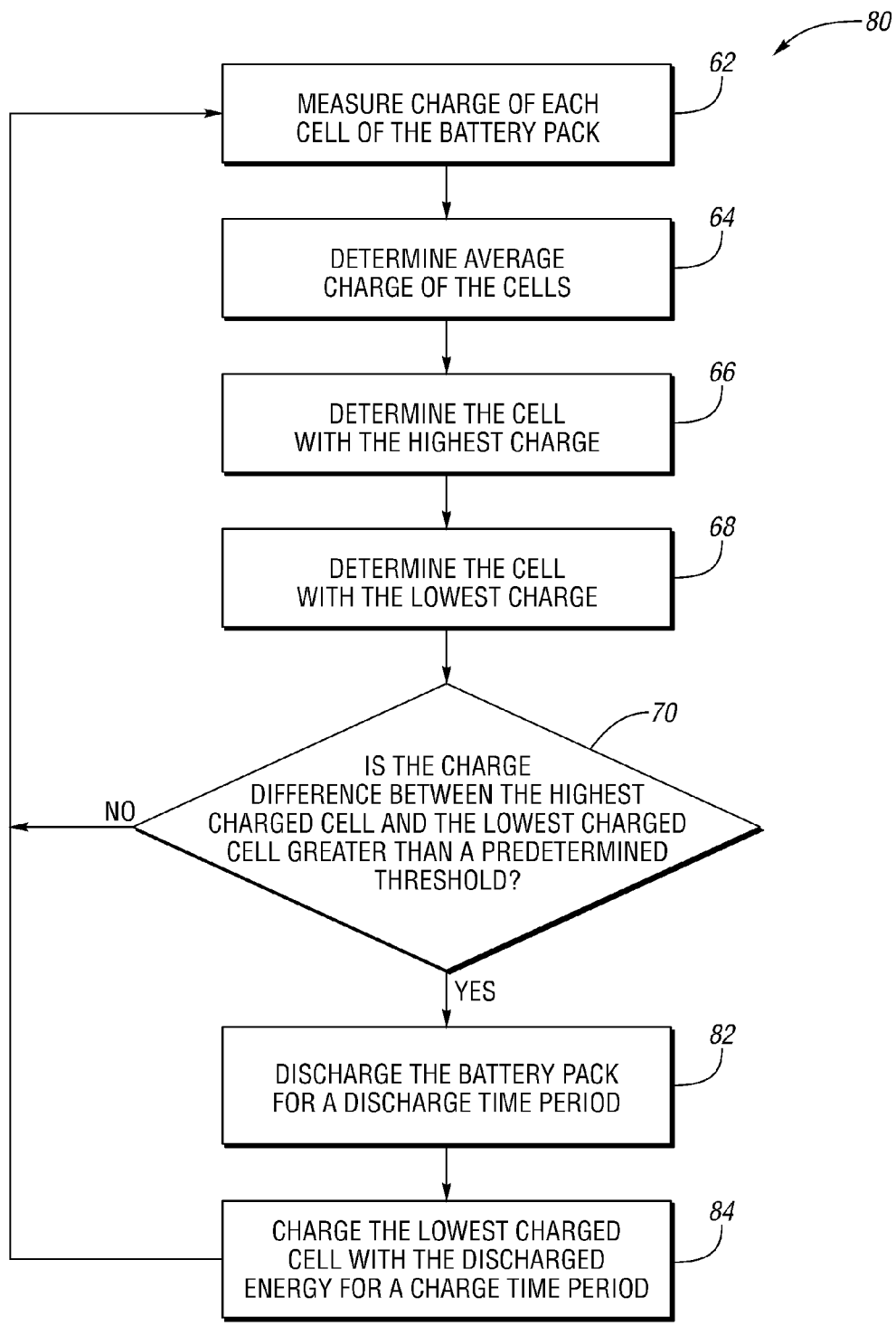
FIG. 4 illustrates a flow chart describing operation of an energy converting fast-active cell balancing method with variable duration discharge for a top balancing operation mode in accordance with an embodiment of the present invention.

Referring now to FIG. 4, a flowchart 80 describing operation of the energy converting fast-active battery cell balancing method with variable duration discharge for the first or top balancing operation mode is shown. Again, the operation of this method will be explained with reference to switched transformer balancing arrangement 50 shown in FIG. 2 which has a battery pack 16 that includes cells C1, C2, . . . , Cn in series. Again, it is assumed that at an arbitrary time each cell has a different charge (i.e., a different SOC) denoted by z with cell C1 having a charge $z_i$ or $SOC_1$, cell C2 having a charge $z_2$ or $SOC_2$, etc., such that the i-th cell has a charge $z_i$ or $SOC_i$.

The operation of this method begins with controller 32 carrying out the above-described procedures of blocks 62, 64, 66, and 68. In turn, controller 32 determines if the charge difference between highest charged cell and the lowest charged cell is greater than a predetermined threshold (e.g., calibrating parameter δ) as indicated in block 70. If so, then a balancing cycle starts. If not, then this iteration through the method is terminated and a new iteration starting at block 62 commences when the method is repeated.

The balancing cycle begins with discharging the entire battery pack 16 for a discharge time period as indicated at block 82. As described, this entails discharging the entire battery pack 16 through primary winding 26 during the discharge time period. Through this, charge is taken from entire battery pack 16 and is stored in primary winding 28. This phase of the balancing cycle is the discharge phase.

The balancing cycle continues after the discharge phase with charging the lowest charged cell (in this case, the lowest charged cell is the last cell Cn pursuant to the above-noted assumption that cell $C_i$ has the ith highest SOC) with the charge taken from the entire battery pack 16 as indicated at block 84. As noted above, secondary winding 28 is connected to cell Cn and primary winding 26 is disconnected from battery pack 16. Through this, the charge that has been taken from the entire battery pack 16 and stored in primary winding 26 is transferred to secondary winding 28 connected to cell Cn. In turn, this charge flows from primary winding 26 into cell Cn. This phase of the balancing cycle is the charge phase.

For this method, the time period that the entire battery pack 16 is discharged is the discharge time period ($T_d$) and the time period that cell Cn is charged is the charge time period ($T_c$). Again, for this method, the discharge time period ($T_d$) is determined for a given balancing cycle as a function of factors pertaining to that balancing cycle and, as a result, the discharge time period ($T_d$) for one balancing cycle will be different than the discharge time period ($T_d$) for another balancing cycle. This operation of determining discharge time periods for different balancing cycles in which the discharge time periods are different from one another (as the factors of the different balancing cycles are different) gives rise to the "variable duration discharge" feature of this method. Again, this can be understood as the discharge time periods change from one balancing cycle to the next balancing cycle in correspondence to the changed factors between the balancing cycles.

In this method, the discharge time period ($T_d$) for a given balancing cycle is determined as a function of the charge difference between the highest charged cell and the lowest charged cell at the beginning of the balancing cycle, i.e., the discharge time period ($T_d$) is a function of $z_1(0)-z_n(0)$, where the beginning of the balancing cycle is at time t=0, $z_1(0)$ is the charge of the highest charged cell at the beginning of the balancing cycle, and $z_n(0)$ is the charge of the lowest charged cell at the beginning of the balancing cycle. For instance, the discharge time period ($T_d$) is determined as a function of the time that it takes to discharge the entire battery pack 16 for the lowest charged cell to be charged with enough energy to become the highest charged cell. Thus, the discharge time period ($T_d$) for one balancing cycle is different than the discharge time period ($T_d$) for another balancing cycle as the pairing of the highest and lowest charged cells and the charges carried by these cells will likely change from one balancing cycle to the next balancing cycle.

As explained below, the charge time period ($T_c$) in which cell Cn is charged during a given balancing cycle with the energy taken from the entire battery pack 16 is a function of the discharge time period ($T_d$) of that balancing cycle.

The operation of this method for determining a discharge time period ($T_d$) for a given balancing cycle will now be explained in greater detail. Assume that the discharge phase starts at time $t_0$. The discharge current is:

$$\frac{dI_d}{dt} = -\frac{V_p}{L_p},$$

$$I_d(t) = -\frac{V_p}{L_p}t,$$

where $L_p$ is the primary winding inductance and $V_p$ is the pack voltage.

The SOC of the cell Ci at the end of the discharge can be calculated as:

$$z_i(T_d) = z_i(0) - \frac{1}{C_i}\int_0^{T_d}\frac{V_p}{L_p}t\,dt = z_i(0) = \frac{V_p T_d^2}{2C_i L_p}, \quad (8)$$

where $C_i$ is the capacity of cell i.

The stored energy in the secondary winding is equal to:

$$W(T_d) = -\int_0^{T_d}\frac{V_p^2}{L_p}t\,dt = -\frac{V_p T_d^2}{2L_p}. \quad (9)$$

The discharge energy is used to charge the lowest SOC cell through the secondary winding by producing the charge current can be calculated as:

$$\frac{dI_c}{dt} = \frac{V_n}{L_s},$$

$$I_c(t) = \frac{V_n}{L_s}t,$$

where $L_s$ is the secondary winding inductance and $V_n$ is the cell n voltage.

The total charge energy is:

$$W(T_c) = \int_0^{T_c}\frac{V_n^2}{L_s}t\,dt = \frac{V_n^2 T_c^2}{2L_s}. \quad (10)$$

Since the charge and the discharge energy from equations (9) and (10) are equal ($W(T_d)=-W(T_c)$), $$T_c = T_d\frac{V_p}{V_n}\sqrt{\frac{L_s}{L_p}}. \quad (11)$$

As indicated above, cell Cn (i.e., the lowest charged cell) is charged until its charge reaches the charge of the highest charged cell after the battery pack 16 has been discharged whereby at least one of the intermediate charged cells becomes the lowest charged cell. This strategy reduces the number of balancing events of cell Cn which is the weakest cell in pack 16. The SOC of the cell Cn at the end of charge is:

$$z_n(T_d + T_c) = z_i(0) - \frac{V_p T_d^2}{2C_n L_p} + \frac{V_n T_c^2}{2C_n L_s} \quad (12)$$

where the first term is the initial SOC, the second term describes the decrease of SOC due to the pack discharge, and the third term describes the increase of SOC due to charging the cell Cn.

Since the goal is to achieve $z_1(T_d)=z_n(T_d+T_c)$, with regard to equations (8) and (12), the following equation set forth $T_c$ (assuming that $C_1 \approx C_n$)

$$T_c = \sqrt{\frac{2(z_1(0)-z_n(0))C_n L_s}{V_n}} \quad (13)$$

However, it needs to be assured that after the discharging phase none of the cells have a SOC less than the minimum allowable SOC, denoted by $SOC_{min}$. If none of the cells have a SOC reaching $SOC_{min}$ after finishing the pack discharge, then $z_1(T_d)=z_n(T_d+T_c)$, and from equations (11) and (13) the discharge time period ($T_d$) is:

$$T_d = \sqrt{\frac{2(z_1(0) - z_n(0))C_n L_p V_n}{V_p^2}}, \quad (14)$$

The charge time period ($T_c$) is calculated by equation (13).

However, as indicated above, none of the cells are to have a SOC less than $SOC_{min}$ during the discharge phase. So the following condition must hold:

$$z_i(T_d) = z_i(0) - \frac{V_p T_d^2}{2C_i L_p} \geq SOC_{min} \forall\ i = 1, \ldots, n,$$

Consequently:

$$T_d = \begin{cases} \sqrt{\frac{2(z_1(0)-z_n(0))C_n L_p V n}{V_p^2}} & \text{if } \frac{(z_1(0)-z_n(0))C_n V_n}{V_p} \leq b, \\ T_d = \sqrt{2b} & \text{otherwise,} \end{cases} \quad (15)$$

where $$b := \min_{i=1,\ldots,n}(z_i(0) - SOC_{min})C_i.$$

The charge time period ($T_c$) can be found from equation (11).

This concludes the description regarding the operation of the energy converting fast-active battery cell balancing method with variable duration discharge for the first or top balancing operation mode which is the subject of FIG. 4. As generally described, energy from the entire battery pack 16 is used to charge a low charged cell to increase the charge of the low charged cell to the charge of the highest charged cell.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for balancing cells of a vehicle battery having a highest charged cell, a lowest charged cell, and one or more intermediate charged cells, the method comprising:
   discharging charge from the highest charged cell without charging any of the cells for a discharge time period until the highest charged cell becomes the lowest charged cell whereby at least one of the intermediate charged cells becomes the highest charged cell.

2. The method of claim 1 further comprising:
   charging the cells with the discharged charge for a charge time period after the discharge time period.

3. The method of claim 2 wherein:
   the charge time period is a function of the discharge time period.

4. The method of claim 2 further comprising:
   identifying the cell having the highest charge at a next time after the charge time period and the cell having the lowest charge at the next time;
   discharging charge from the highest charged cell at the next time for a discharge time period dependent on the charge difference between the highest charged cell and the lowest charged cell at the next time.

5. The method of claim 1 wherein:
   the discharging is initiated when the charge difference between the highest charged cell and the lowest charged cell is greater than a predetermined threshold.

6. The method of claim 1 wherein each cell has a maximum charge capability, wherein:
   the discharge time period is further dependent on the charge differences between the maximum charge capability and the charge of each of the cells.

7. The method of claim 1 wherein:
   the battery is a Lithium-Ion battery and the cells are Lithium-Ion cells.

8. A system for balancing cells of a vehicle battery having a highest charged cell, a lowest charged cell, and one or more intermediate charged cells, the system comprising:
   a transformer arrangement configured to discharge charge from any of the cells and to charge the cells with the discharged charge; and
   a controller configured to control the transformer arrangement to discharge charge from the highest charged cell without charging any of the cells for a discharge time period until the highest charged cell becomes the lowest charged cell whereby at least one of the intermediate charged cells becomes the highest charged cell.

9. The system of claim 8 wherein:
   the controller is further configured to control the transformer arrangement to charge the cells with the discharged charge for a charge time period after the discharge time period.

10. The system of claim 9 wherein:
    the charge time period is a function of the discharge time period.

11. The system of claim 9 wherein:
    the controller is further configured to identify the cell having the highest charge at a next time after the charge time period and the cell having the lowest charge at the next time;
    wherein the controller is further configured to control the transformer arrangement to discharge charge from the highest charged cell at the next time for a discharge time period dependent on a charge difference between the highest charged cell and the lowest charged cell at the next time.

12. The system of claim 8 wherein:
    the controller is further configured to enable the transformer arrangement to discharge charge from the highest charged cell upon the charge difference between the highest charged cell and the lowest charged cell being greater than a predetermined threshold.

13. The system of claim 8 wherein:
    each cell has a maximum charge capability;
    wherein the discharge time period is further dependent on the charge differences between the maximum charge capability and the charge of each of the cells.

14. The system of claim 8 wherein:
    the battery is a Lithium-Ion battery and the cells are Lithium-Ion cells.

15. The system of claim 8 wherein:
the transformer arrangement is a switched transformer arrangement.

16. The system of claim 8 wherein:
the transformer arrangement is a shared transformer arrangement.

* * * * *